US006175302B1

United States Patent
Huang

(10) Patent No.: US 6,175,302 B1
(45) Date of Patent: *Jan. 16, 2001

(54) TIRE PRESSURE INDICATOR INCLUDING PRESSURE GAUGES THAT HAVE A SELF-GENERATING POWER CAPABILITY

(76) Inventor: Tien-Tsai Huang, No. 4-2, Lane 30, Wu Chuan St., Pan Chiao City, Taipei, Taiwan (TW)

( * ) Notice: Under 35 U.S.C. 154(b), the term of this patent shall be extended for 0 days.

This patent is subject to a terminal disclaimer.

(21) Appl. No.: 09/285,451

(22) Filed: Apr. 2, 1999

(51) Int. Cl.[7] ................................................. B60C 23/00
(52) U.S. Cl. .................. 340/442; 340/447; 73/146.3; 73/146.4
(58) Field of Search ..................... 340/442, 443, 340/444, 445, 446, 447, 448; 73/146.2, 146.3, 146.4, 146.5

(56) References Cited

U.S. PATENT DOCUMENTS

| | | | | |
|---|---|---|---|---|
| 4,384,482 | * | 5/1983 | Snyder | 340/442 |
| 4,510,484 | * | 4/1985 | Snyder | 340/442 |
| 4,701,742 | * | 10/1987 | Ruehr | 340/442 |
| 4,745,803 | * | 5/1988 | Haavasoja | 340/442 |
| 4,945,337 | * | 7/1990 | Huang | 340/442 |
| 4,970,894 | * | 11/1990 | Huang | 340/442 |
| 5,025,244 | * | 6/1991 | Huang | 340/442 |
| 5,040,561 | * | 8/1991 | Achterholt | 340/442 |
| 5,285,189 | * | 2/1994 | Nowicki et al. | 340/447 |
| 5,289,161 | * | 2/1994 | Huang | 340/442 |
| 5,325,901 | * | 7/1994 | Olney et al. | 152/418 |
| 5,473,938 | * | 12/1995 | Handfield et al. | 73/146.5 |
| 5,694,111 |   | 12/1997 | Huang | 340/442 |
| 5,781,104 | * | 7/1998 | Huang | 340/442 |
| 5,798,689 | * | 8/1998 | Huang | 340/442 |
| 5,889,464 | * | 3/1999 | Huang | 340/442 |
| 6,016,102 | * | 1/2000 | Fortune et al. | 340/442 |
| 6,031,450 | * | 2/2000 | Huang | 340/442 |

* cited by examiner

Primary Examiner—Nina Tong
(74) Attorney, Agent, or Firm—Bacon & Thomas, PLLC

(57) ABSTRACT

A tire pressure indicator comprises a set of pressure gauges respectively installed in the tires of a vehicle, and receiver circuit means installed in the vehicle adjacent to the tires. Each pressure gauge includes a power supplying device, a pressure-sensing unit, and a transmitter circuit. The power-supplying device has a self-generating voltage unit formed by a piezoelectric element, a spring element, and a weight. The spring element is vibrated when the tires of the vehicle are in motion, thereby causing the piezoelectric element to generate power supply. The pressure-sensing unit includes a capacitor means formed by a motion member, a conductive member, and a converting circuit. The motion member is made of electrically conductive material and is moved relative to the conductive member subject to the air pressure of the respective tire, so as to change the capacity of the capacitor means, enabling the converting circuit to output a first signal to the transmitter circuit subject to RC oscillation waveform detected. The transmitter transmits a second signal into the air by radio upon receipt of the first signal.

10 Claims, 14 Drawing Sheets

TIRE PRESSURE INDICATOR INCLUDING PRESSURE GAUGES THAT HAVE A SELF-GENERATING POWER CAPABILITY

BACKGROUND OF THE INVENTION

1. Field of the Invention

The invention relates to a tire pressure indicator, more particularly to one including pressure gauges that have a self-generating power capability.

2. Description of the Related Art

A tire pressure indicator is to be installed in a vehicle to monitor the pressure of the tires of the vehicle. A regular tire pressure indicator is generally comprised of a set of pressure gages, each of which is mounted on a corresponding pneumatic tire of the vehicle, and a receiver device. Each pressure gauge wirelessly transmits a pressure signal to the receiver device when the pressure in the corresponding pneumatic tire is not within a predetermined normal operating pressure range. As such, the receiver device can alert the driver of the vehicle in the event of an abnormal tire pressure condition.

Since the receiver device of a known tire pressure indicator is built into an instrument panel of the vehicle, or as a separate device to be installed in the driver's compartment of the vehicle, the power source of the vehicle can be used as the power source for the receiver device. However, since the pressure gauges of the known tire pressure indicator are mounted on the tires of the vehicle, battery cells are used as the power source for the pressure gauges. The need to replace the battery cells when they run out of power inconveniences the owner of the vehicle.

In order to eliminate the aforesaid problem, the same applicant filed an application for a tire pressure indicator, which subsequently issued as U.S. Pat. No. 5,694,111. The structure of this tire pressure indicator comprises a piezoelectric type self-generating voltage means, and an LC oscillatory loop formed of a volume variable member, a magnetic core, and an induction coil. This structure of the tire pressure indicator is functional, however, the installation cost of the LC oscillatory loop is expensive.

SUMMARY OF THE INVENTION

It is an object of the present invention to provide a tire pressure indicator which has self-provided power generating means to provide the necessary working power economically.

It is another object of the present invention to provide a wireless tire pressure indicator, which eliminates radio signal transmission interference.

According to the present invention, the tire pressure indicator comprises a plurality of pressure gauges, at least one receiver circuit adapted to be installed in the vehicle to receive output signal from said pressure gauges wirelessly, and a controller. Each of the pressure gauges comprises a casing, a power supplying device, a pressure sensing unit, and a transmitter circuit. The power-supplying device comprises a self-generating voltage unit. The self-generating voltage unit comprises a spring element having a first end secured to a casing and a second end, a weight securely mounted on the second end of the spring element, and a piezoelectric unit securely mounted on the spring element. The spring element is vibrated upon motion of the respective pneumatic tire, thereby causing the piezoelectric unit to generate a voltage output to the pressure sensing unit and the transmitter circuit. The pressure sensing unit comprises a capacitor means. The capacitor means comprises a motion member, a conductive member, and a converting circuit. The motion member is made of electrically conductive material and is spaced from the conductive member at a distance. The distance between the motion member and the conductive member is changed subject to the air pressure of respective pneumatic tire, thereby causing the capacity of the capacitor means to be changed relatively. The converting circuit comprises an oscillator connected to the capacitor means such that the converting circuit detects the number of RC oscillating waves from the oscillator and converts the detected signal into a first signal indication of the pressure of the respective pneumatic tire. The transmitter circuit receives the first signal from the pressure-sensing unit, and outputs a second signal by radio. A respective receiver circuit is installed in the vehicle adjacent to each pneumatic tire. The motion member comprises a top side wall, a bottom mouth, and a bellows-like peripheral wall connected between the top side wall and the bottom mouth and defining an air chamber in communication with the bottom mouth. The bottom mouth receives air pressure from the respective pneumatic tire for moving the top side wall relative to the conductive member so as to change the capacity of the capacitor means subject to the pressure of the respective pneumatic tire.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
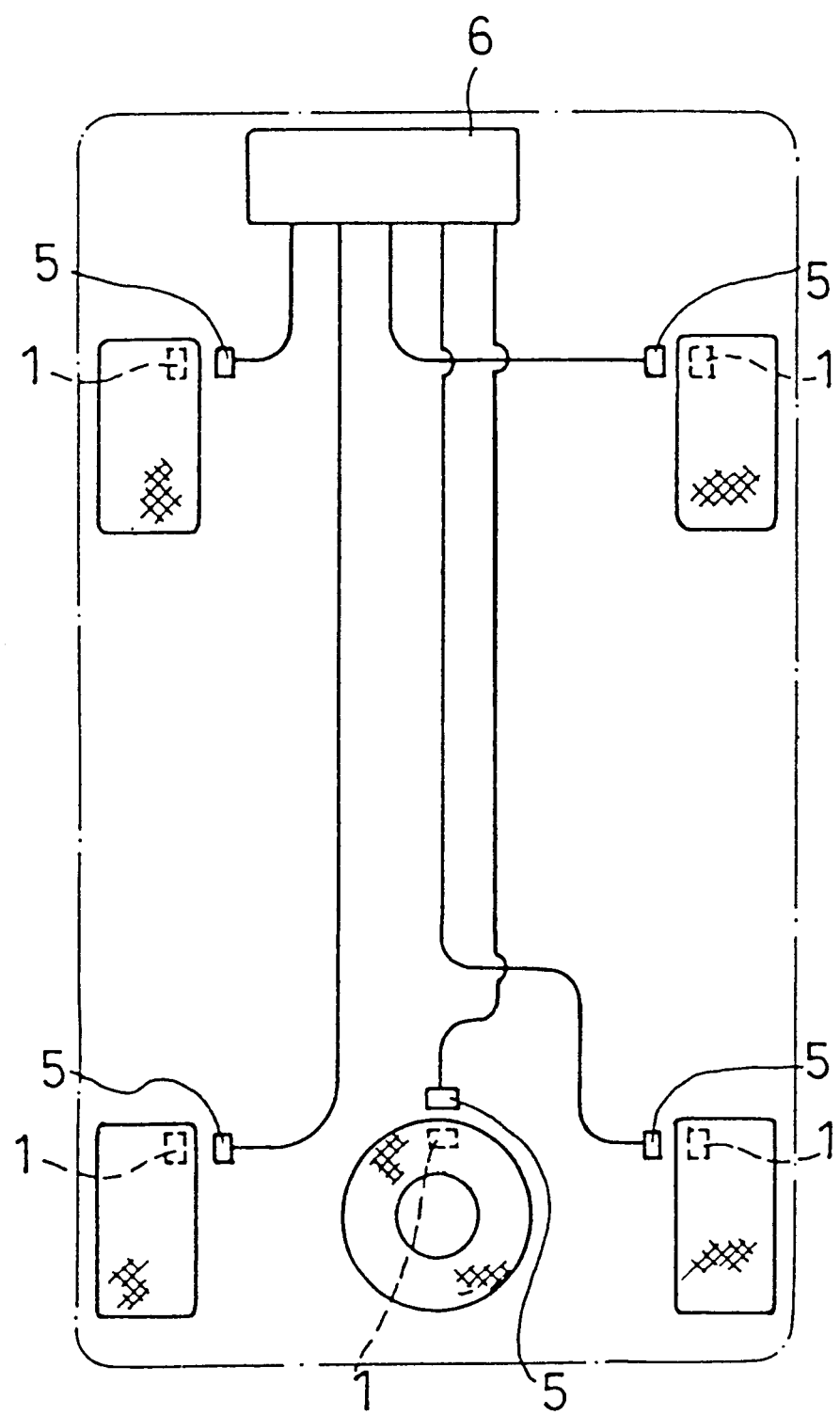
FIG. 1 is a schematic view illustrating the first preferred embodiment of a tire pressure indicator according to the present invention when installed on a vehicle.

Referring to FIG. 1, a first preferred embodiment of the tire pressure indicator according to the present invention is shown, comprised of a set of pressure gauges 1, a set of receiver circuits 5, and a controller 6. Each of the pressure gauges 1 is adapted to be mounted on the inflating valve of a respective one of the pneumatic tires on a vehicle, and wirelessly transmits a pressure signal corresponding to the pressure in the respective one of the pneumatic tires. Each of the receiver circuits 5 is adapted to be mounted on the vehicle adjacent to a respective one of the pneumatic tires so as to receive the pressure signal from the pressure gauge 1 on the adjacent one of the pneumatic tires. The controller 6, which is preferably built into an instrument panel (not shown) on the vehicle, is connected to the receiver circuits 5. The controller 6 alerts the driver of the vehicle in the event of an abnormal tire pressure condition.

Figure 2:
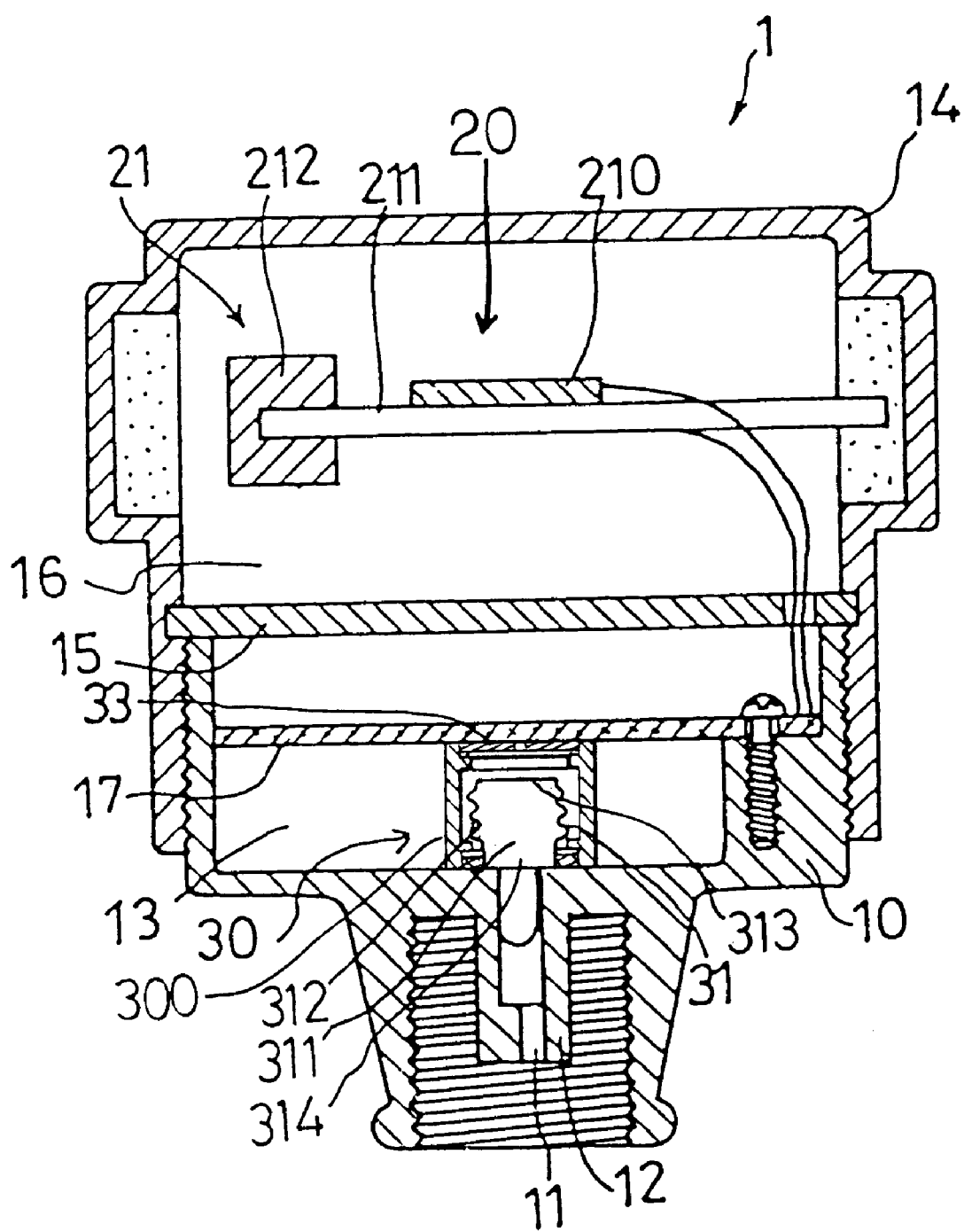
FIG. 2 is a sectional view of a pressure gauge of the first preferred embodiment.
Figure 3:
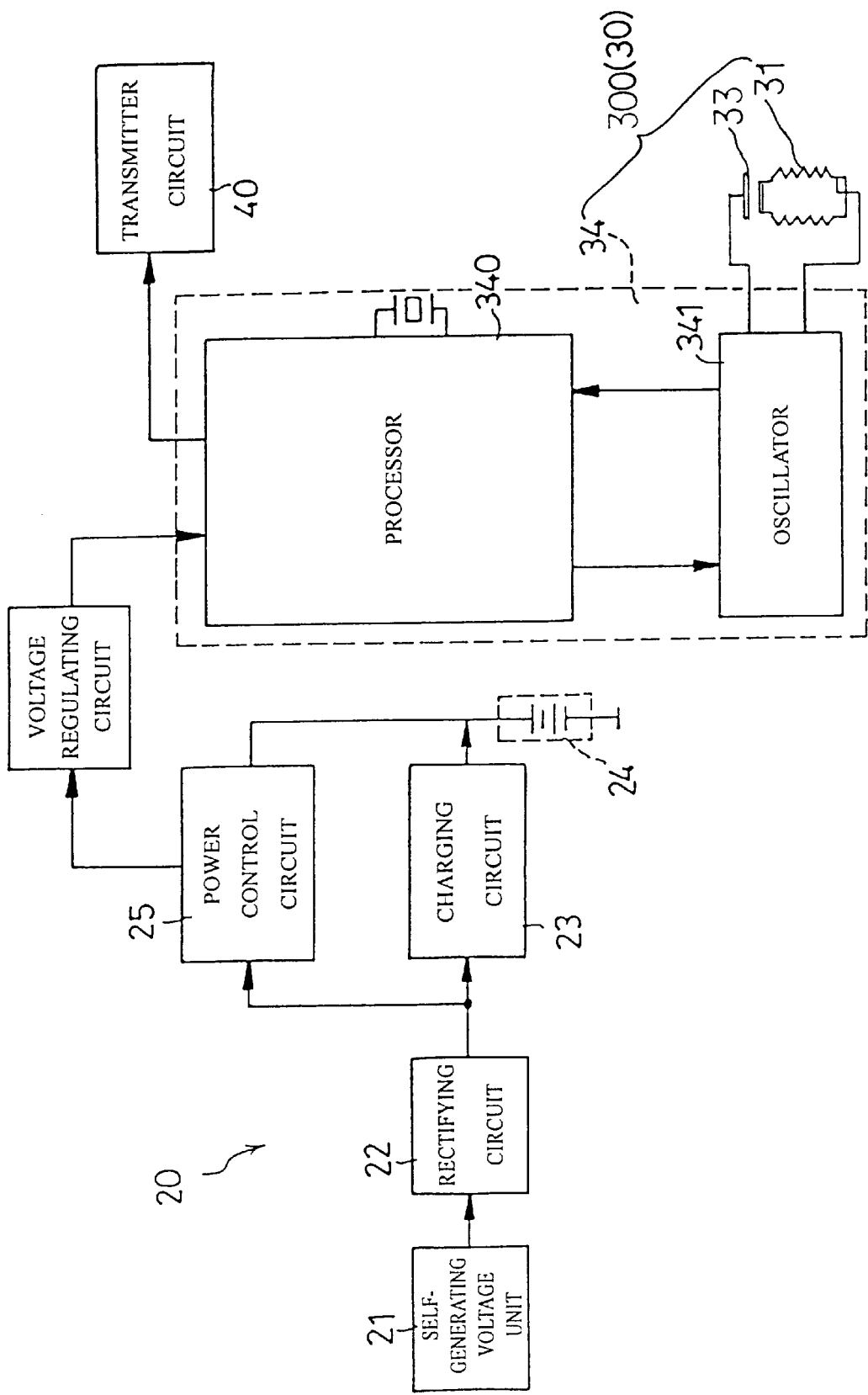
FIG. 3 is a schematic circuit block diagram of the pressure gauge shown in FIG. 2.

Referring to FIGS. 2 and 3, the pressure gauge 1 comprises a casing 10 having mounted therein a power supplying device 20, a pressure sensing unit 30, and a signal transmitter circuit 40.

The casing 10 comprises a passage 11 in communication with the inside or air valve of the respective pneumatic tire, a tubular finger piece 12 inserted into the passage 11. When the pressure gauge 1 is installed in the respective pneumatic tire, the air of the pneumatic tires passes through the passage 11 into the casing 10, filling a first chamber 13 of the casing 10. A cap 14 is threadly connected with the casing 10. A partition plate 15 is mounted in the cap 14, defining a second chamber 16. A circuit board 17 is mounted within the first chamber 13. The pressure sensing unit 30 and the signal transmitter circuit 40 are mounted on the circuit board 17 inside the first chamber 13.

Referring to FIG. 3 again, the power supplying device 20 provides the circuit board 17 with the necessary working power supply, comprised of a self-generating voltage unit 21, a rectifying circuit 22, a charging circuit 23, a stand-by power supplying means, for example a rechargeable cell unit 24, and a power control circuit 25. As illustrated in FIG. 2, the self-generating voltage unit 21 is disposed in the second chamber 16, and comprises a piezoelectric unit 210, a spring plate 211, and a weight 212. The spring plate 211 has one end secured to an inner peripheral wall of the second chamber 16, and the other end fixed with the weight 212. The weight 212 enables the spring plate 211 to produce a broad amplitude of vibration. When the pneumatic tires of the vehicle are rotated, the spring plate 211 of the self-generating voltage unit 21 is forced to vibrate continuously, causing the piezoelectric unit 210 to produce a piezoelectric effect and generate an AC voltage output.

Figure 4:
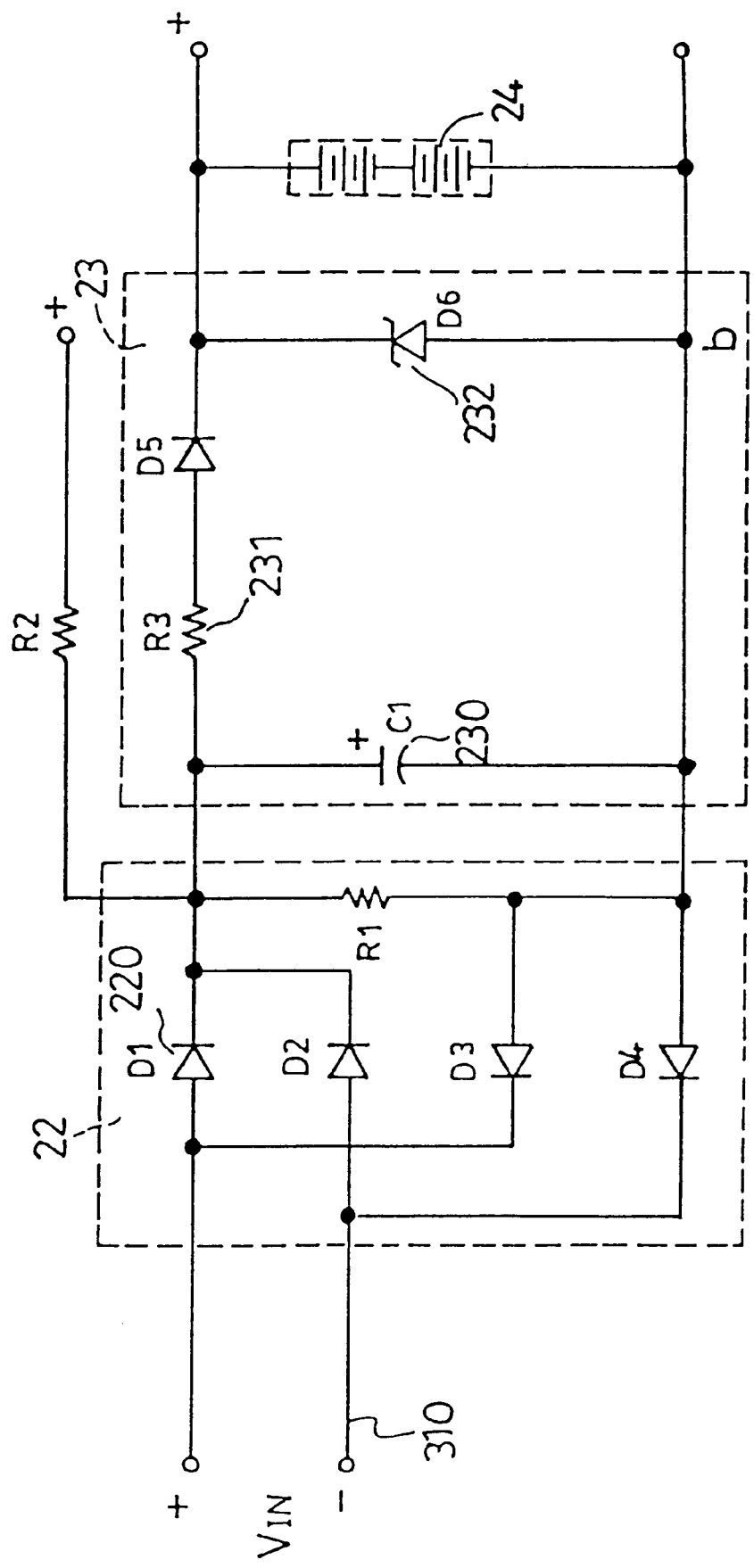
FIG. 4 is a schematic circuit diagram illustrating a rectifying circuit, a charging circuit and a rechargeable cell unit of a power supplying device of the pressure gauge shown in FIG. 2.

Referring to FIG. 4, the rectifying circuit 22 is a full-wave rectifier, comprised of four diodes D1~D4 for rectifying AC power supply from the piezoelectric unit 210 into DC power supply. The charging circuit 23 comprises a voltage storing member 230 (for example, a capacitor), a current limiter 231 (for example, a current limit diode), and a protective member 232 (for example, a zener diode). The rectifying circuit 22 charges the voltage-storing member 230. The current limiter 231 limits the amount of current flowing from the rectifying circuit 22 to the rechargeable cell unit 24. The protective member 232 limits the voltage passing through the rechargeable cell unit 24.

Referring to FIGS. 3 and 4 again, the rechargeable cell unit 24 is connected to the output end of the charging circuit 23, so as to be charged by the self-generating voltage unit 21. The rechargeable cell unit 24 provides the necessary working power supply when the vehicle is temporarily stopped. The power control circuit 25 is connected to the rectifying circuit 22. The power control unit 25 electrically disconnects the rechargeable cell unit 24 from the pressure sensing unit 30 and the signal transmitter unit 40 a certain length of time after the pneumatic tire has been stopped, the self-generating voltage unit 21 has been turned off, and the output of the rectifying circuit 22 has reached zero voltage.

Figure 5:
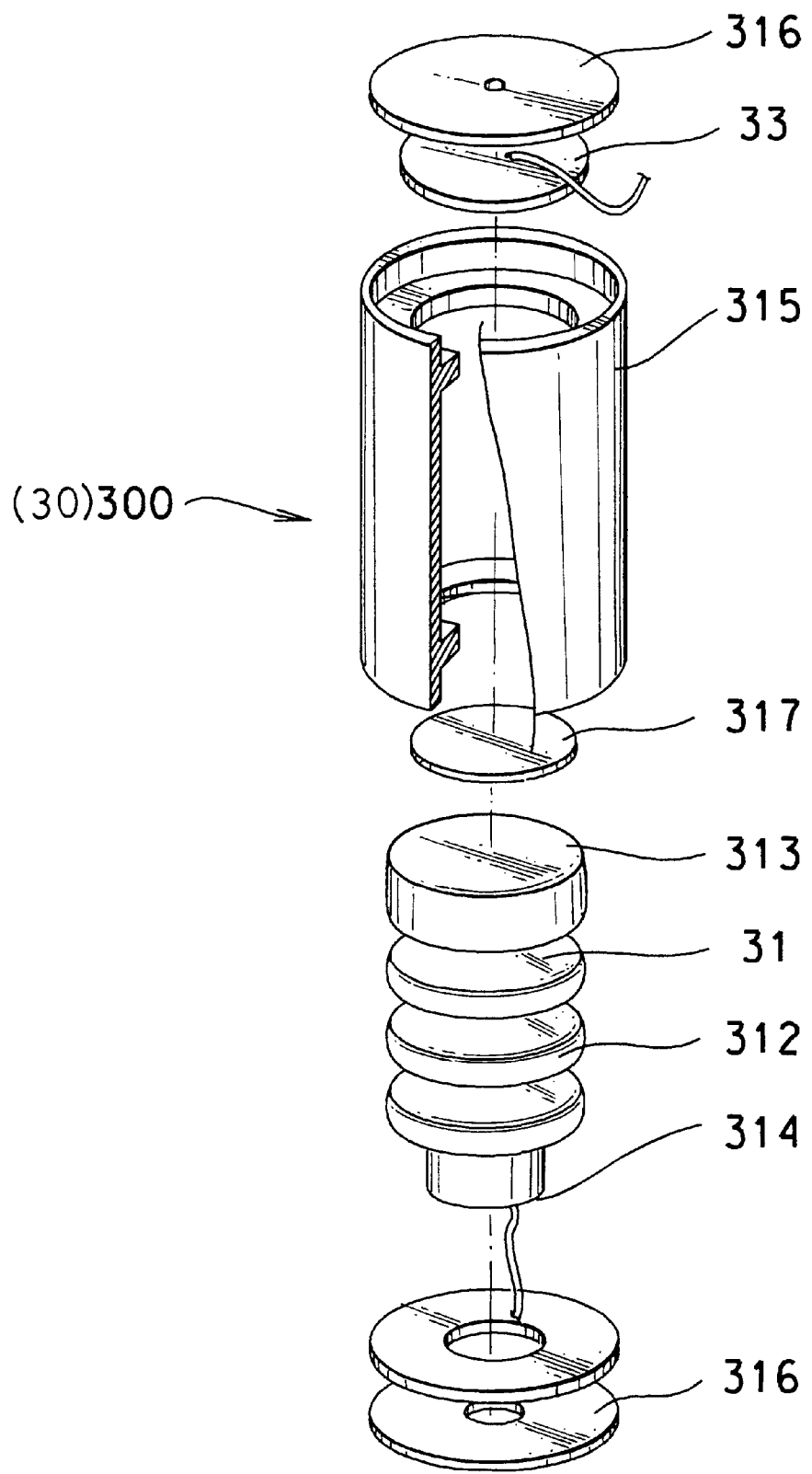
FIG. 5 is an exploded view of a capacitor means for a pressure gauge according to the present invention.
Figure 6:
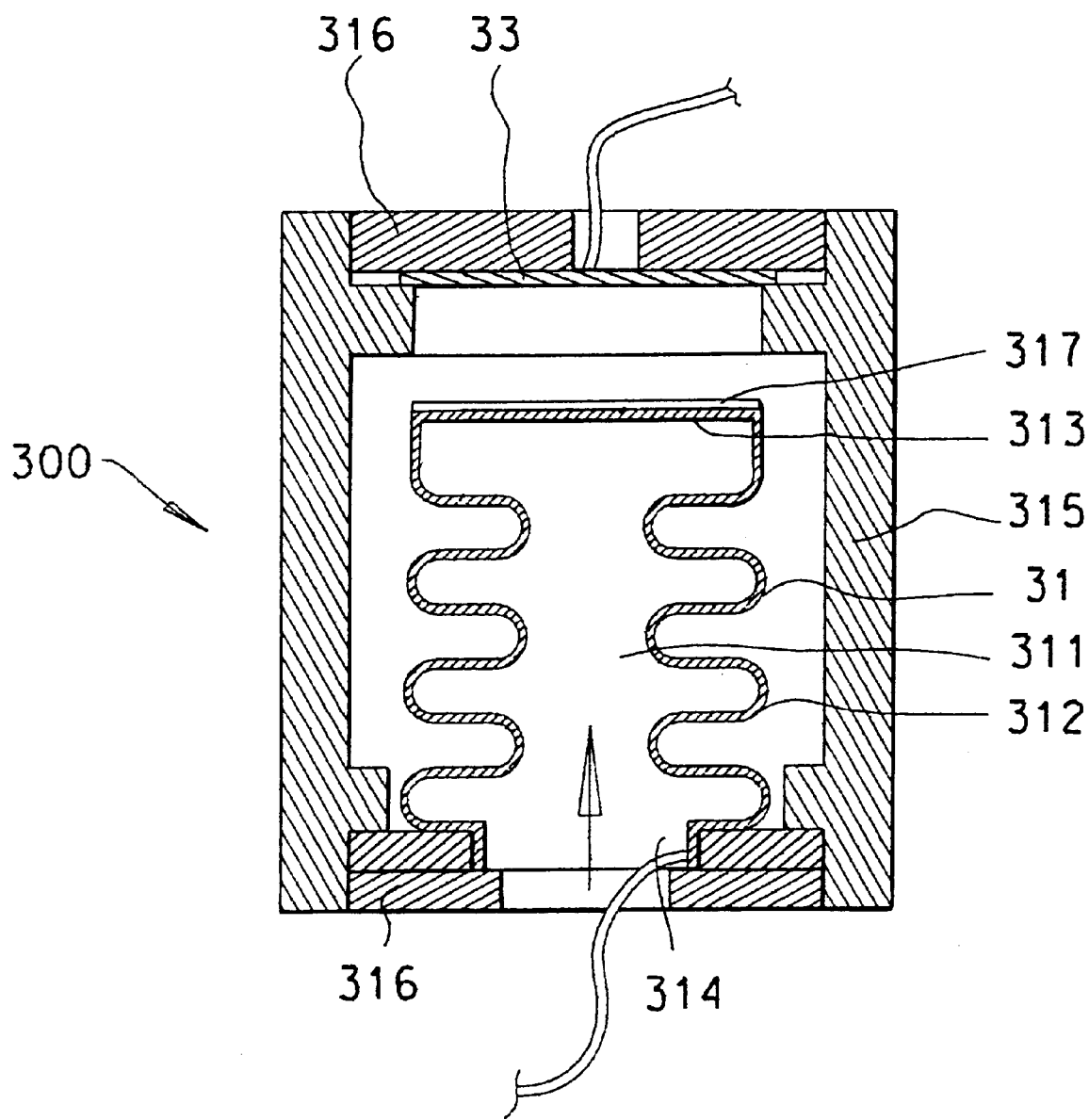
FIG. 6 is a sectional view of an assembled capacitor means according to the present invention.

Referring to FIGS. 5 and 6, and to FIGS. 2 and 3 again, the pressure sensing unit 30 comprises a capacitor means 300. The capacitor means 300 comprises a motion member 31, a conductive member 33, and a converting circuit 34. The conductive member 33 is, for example, a thin copper plate mounted in between the passage 11 and the first chamber 13. The motion member 31 comprises an air chamber 311, a plurality of bellows 312 around the air chamber 311, a top wall 313, and a bottom mouth 314. The bottom mouth 314 enables air to pass into the air chamber 31 and to inpact on the top wall 313, causing the distance between the top wall 313 and the conductive member 33 to be changed, so as to further change the capacity of the capacitor means 300. The motion member 31 and the conductive member 33 are mounted within an insulative shell 315, and are spaced from each other at a distance. Insulative covers 316 are respectively placed on the top and bottom sides of the insulative shell 315. An insulator 317 is set between the motion member 31 and the conductive member 33 to prevent a short circuit.

The converting circuit 34 comprises a processor 340, and an oscillator 341. The capacitor means 300 is connected to the oscillator 341 so that when the distance between the top wall 313 and the conductive member 33 is changed, the output RC oscillating frequency of the oscillator 341 is relatively changed. The processor 340 detects the oscillating frequency output of the oscillator 341, and converts the same into a corresponding pressure value. The processor 340 then controls the signal transmitter circuit 40 to transmit a second signal of radio signal indication of the pressure value.

Figure 7:
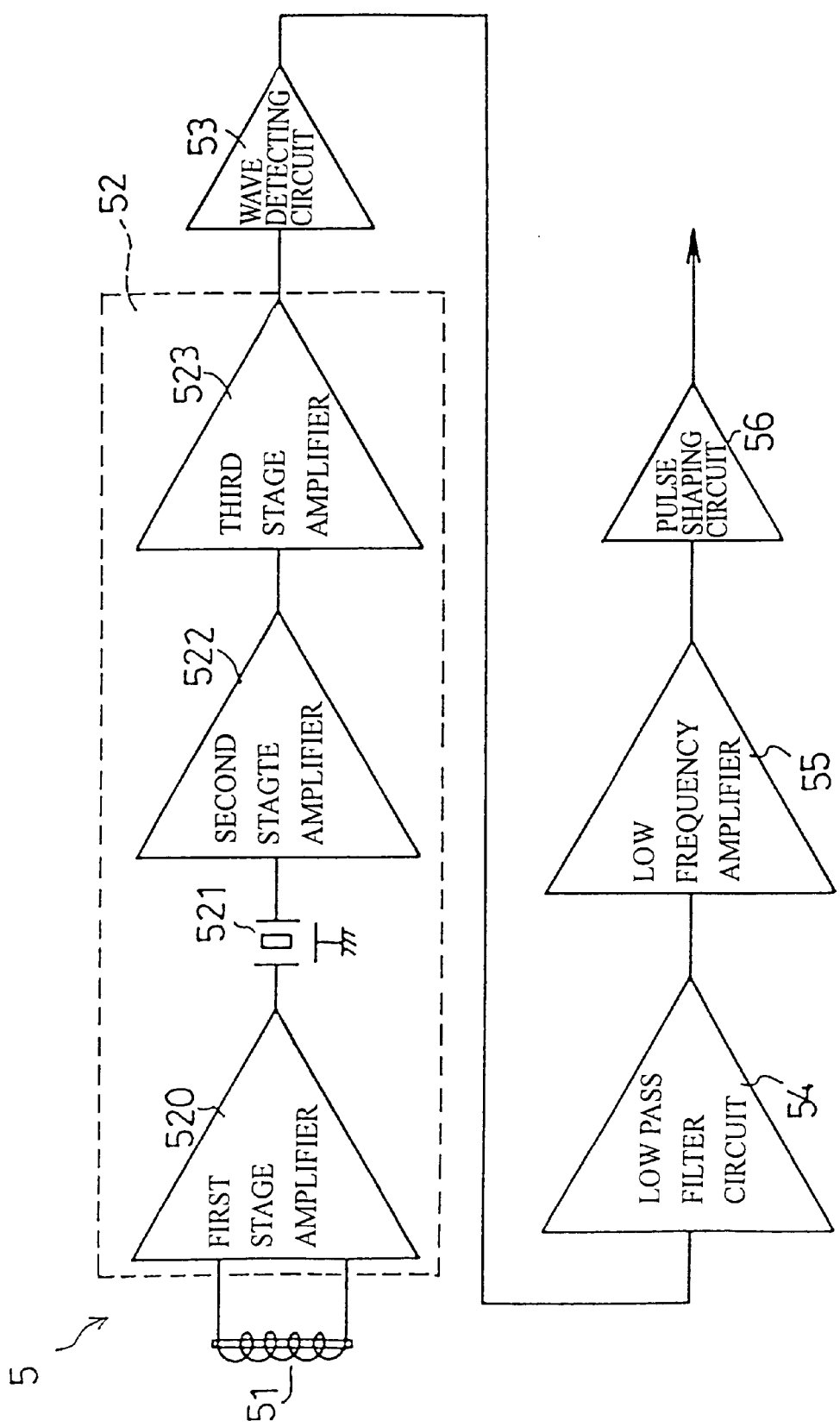
FIG. 7 is a schematic circuit block diagram of a receiver circuit of the first preferred embodiment.
Figure 8:
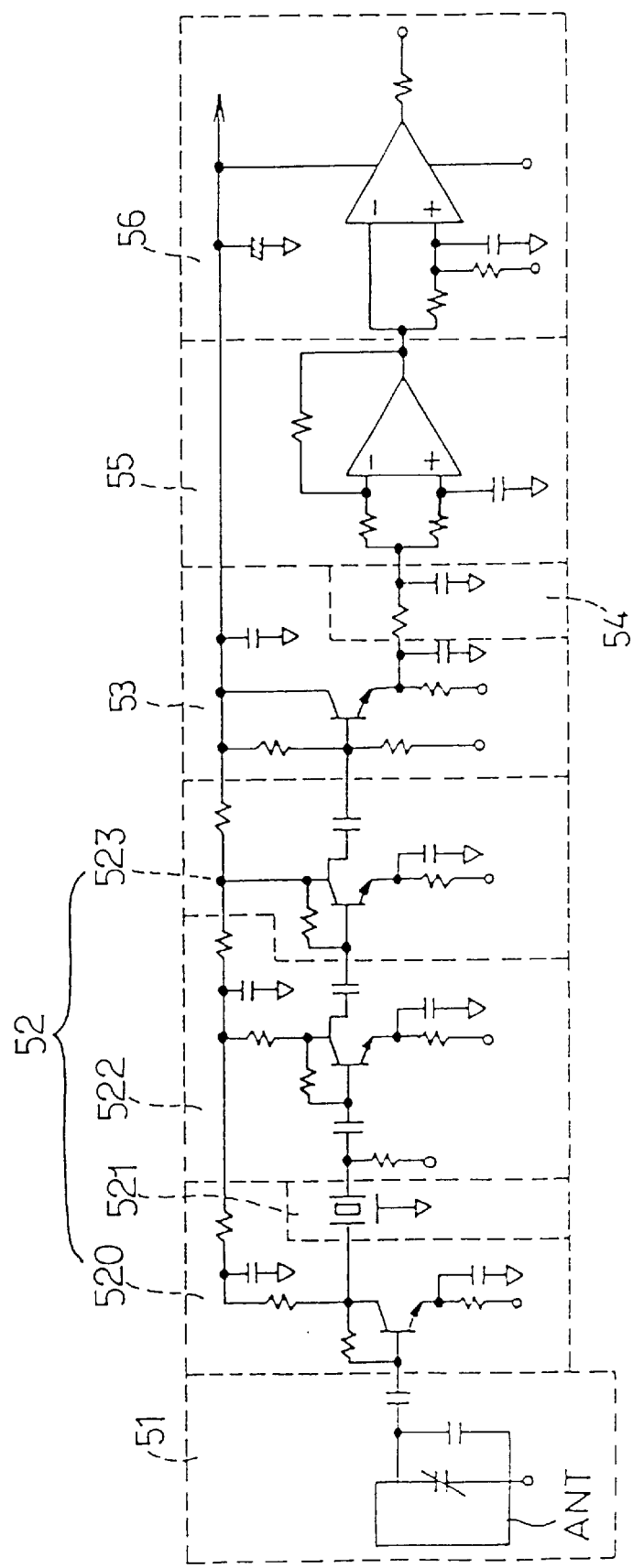
FIG. 8 is a schematic circuit diagram of the receiver circuit of the first preferred embodiment.

Referring to FIGS. 7 and 8, and to FIG. 1 again, each of the receiver circuits 5 is adapted to be mounted on the vehicle adjacent to a respective one of the pneumatic tires so as to receive the pressure signal from the pressure gauge 1 on an the adjacent pneumatic tire with minimal signal interference, thereby improving the accuracy of the tire pressure indicator of this invention. Each receiver circuit 5 comprises a receiving antenna 51, a high frequency amplifying circuit 52, a wave detecting circuit 53, a low pass filter circuit 54, a low frequency amplifier 55, and a pulse shaping circuit 56.

The receiving antenna 51 receives the pressure signal from the pressure gauge 1 on an adjacent pneumatic tire and provides the same to the high frequency amplifying circuit 52. The high frequency amplifying circuit 52 comprises a first stage amplifier 520 connected to the receiving antenna 51, a filter 521 connected to the first stage amplifier 520, a second stage amplifier 522 connected to the filter 521, and a third stage amplifier 523 connected to the second stage amplifier 522. The wave detecting circuit 53 is connected to the high frequency amplifying circuit 52. The low pass filter circuit 54 is connected to the wave detecting circuit 53. The low frequency amplifier 55 is connected to the low pass filter circuit 54. The pulse shaping circuit 56 is connected to the low frequency amplifier 55. The analog voltage output of the low frequency amplifier 55 is processed into a digital third signal by the pulse shaping circuit 56.

Figure 9:
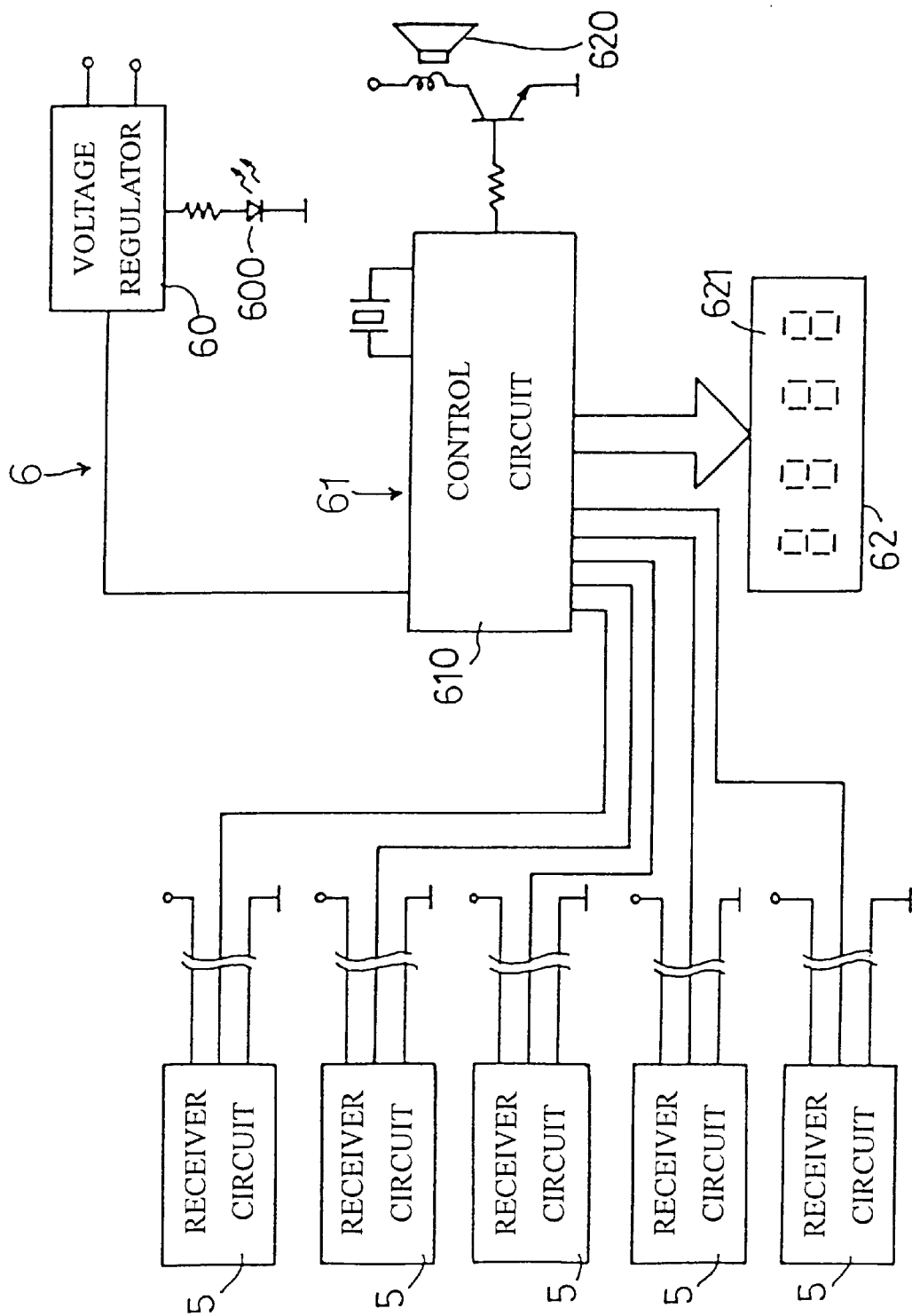
FIG. 9 is a schematic circuit block diagram illustrating a controller of the first preferred embodiment of the present invention.

Referring to FIG. 9, the controller 6 is shown, comprised of a voltage regulator 60, a control circuit 61, and an indicating unit 62.

The voltage regulator 60 is adapted to be connected to the power source (not shown) of the vehicle, and provides an operating voltage to the control circuit 61 and the indicating unit 62. A light emitting diode 600 is connected to the voltage regulator 60, and is operable so as to emit light when power is supplied to the controller 6. The control circuit 61, such as a microprocessor, is connected to the receiver circuits 5 and processes the digital pulse signals therefrom to obtain the pressure values of the pneumatic tires. The indicating unit 62 is connected to the control circuit 61, and includes a sound alarm unit 620 and a display unit 621. The sound alarm unit 620 is activated by the control circuit 61 when the pressure value in any of the pneumatic tires is not within a normal operating pressure range. The display unit 621 can be a liquid crystal display or a light emitting diode display, and is activated by the control circuit 61 to identify the abnormal pneumatic tire(s), the pressure value of which is not within the normal operating pressure range. The display unit 621, which can be an LCD or LED, is further activated by the control circuit 61 to display the pressure value of the abnormal pneumatic tire(s).

Figure 10:
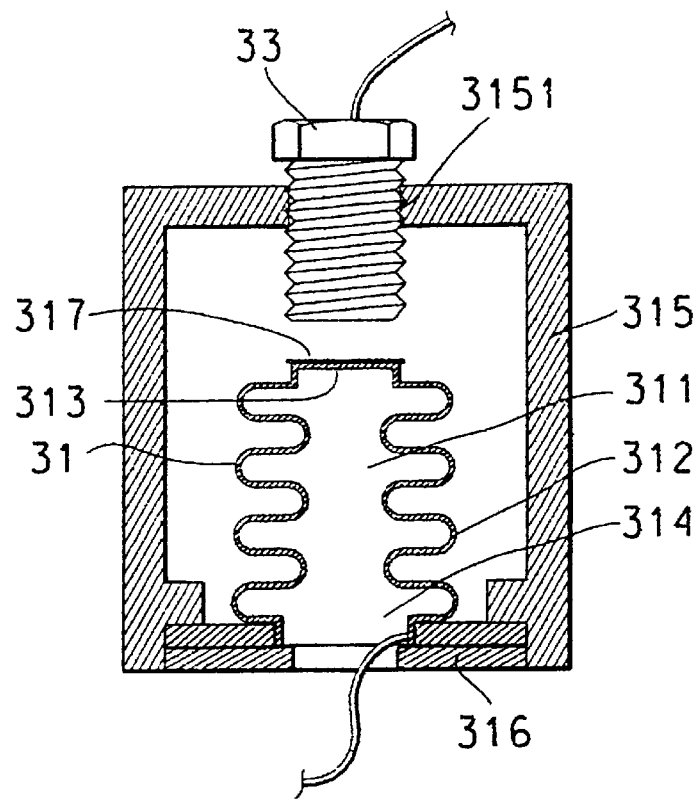
FIG. 10 is a sectional view of an alternative form of an assembled capacitor means according to the present invention.

FIG. 10 shows a second embodiment of the capacitor means 300a according to the present invention. This alternative form is similar to the aforesaid first embodiment with the exception of the conductive member 33. According to this alternative form, the conductive member 33 is a metal screw member threaded into a screw hole 3151 at the insulative shell 315. By turning the conductive member 33 up and down in the screw hole 3151, the capacity of the capacitor means 300 is easily pre-adjusted relatively.

Figure 11:
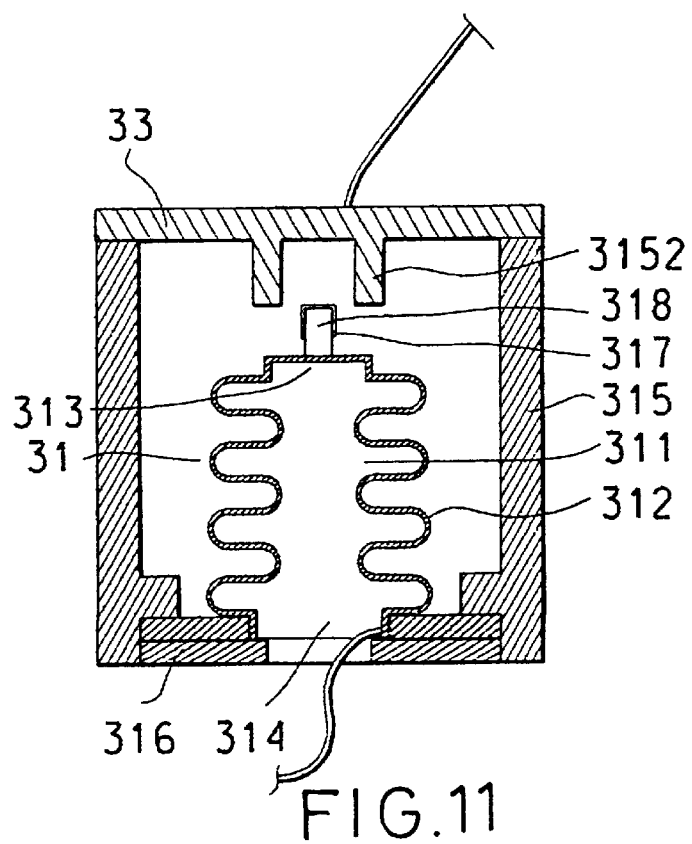
FIG. 11 is a sectional view of another alternative form of an assembled capacitor means according to the present invention.

FIG. 11 shows a third embodiment of the capacitor means 300b according to the present invention. According to this alternative form, the conductive member 33 comprises a tubular flange 3152 extended downwardly from its bottom side wall, a rod 318 is raised from the top wall 313 of the motion member 31 and suspended in the tubular flange 3152. When the volume of the motion member 31 is changed, the elevation of the rod 318 in the tubular flange 3152 is relatively changed, and therefore the capacity of the capacitor means 300 is changed relatively.

Figure 12:
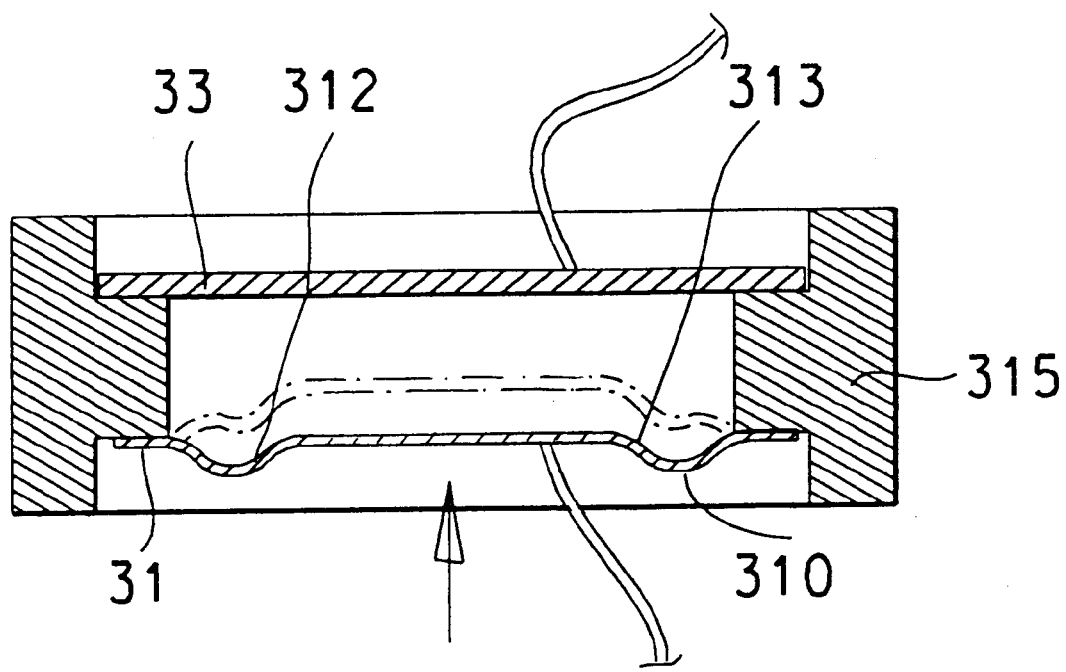
FIG. 12 is a sectional view of still another alternative form of an assembled capacitor means according to the present invention.

FIG. 12 shows a fourth embodiment of the capacitor means 300c according to the present invention. According to this alternative form, the motion member 31 is a thin copper diaphragm having corrugated portions 312, a top side wall 313 and a bottom side wall 310. The bottom side wall 310 receives air pressure from the respective pneumatic tire, enabling the distance between the top side wall 313 and the conductive member 33 to be relatively changed, subject to the value of the air pressure received, so as to relatively change the capacity of the capacitor means 300.

Figure 13:
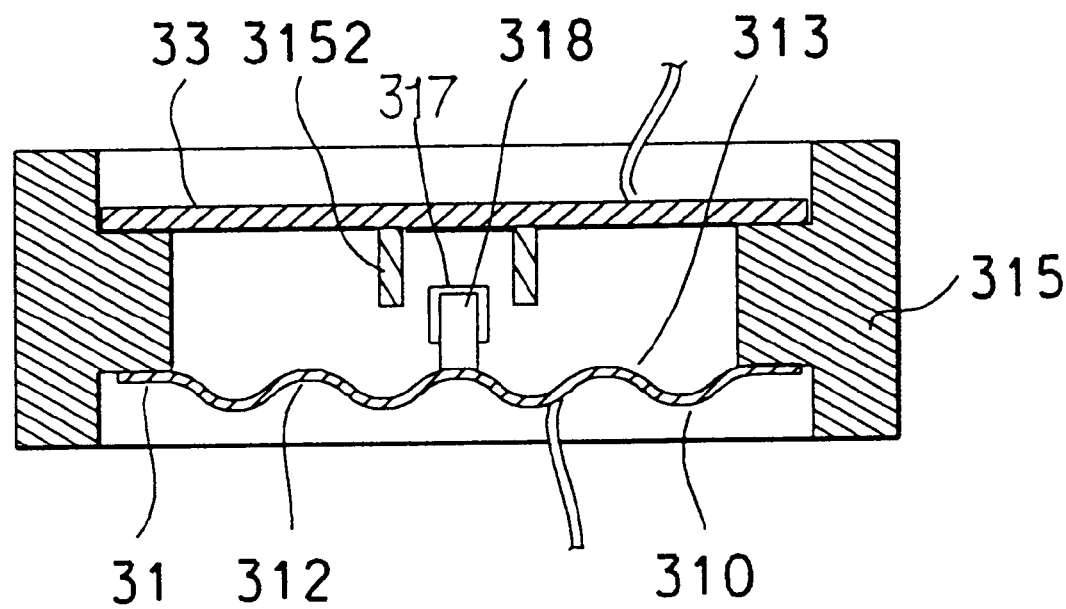
FIG. 13 is a sectional view of still another alternative form of an assembled capacitor means according to the present invention.

FIG. 13 shows a fifth embodiment of the capacitor means 300d according to the present invention. According to this alternative form, the conductive member 33 comprises a tubular flange 3152 extended downwardly from its bottom side wall, a rod 318 is raised from the top side wall 313 of the motion member 31 and suspended in the tubular flange 3152.

Figure 14:
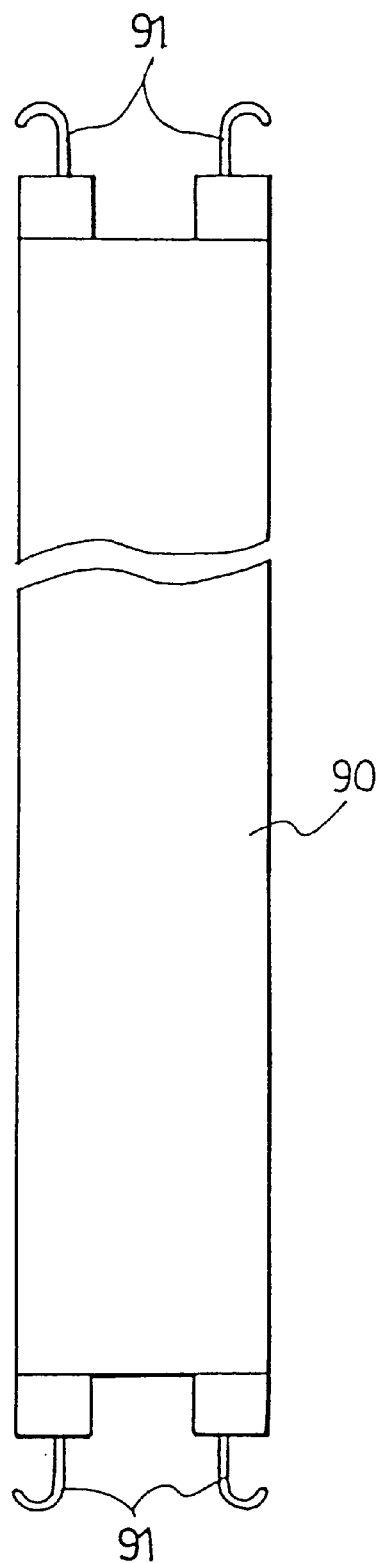
FIG. 14 illustrates an elastic strap used to secure the pressure gauge to the disk wheel of a pneumatic tire.
Figure 15:
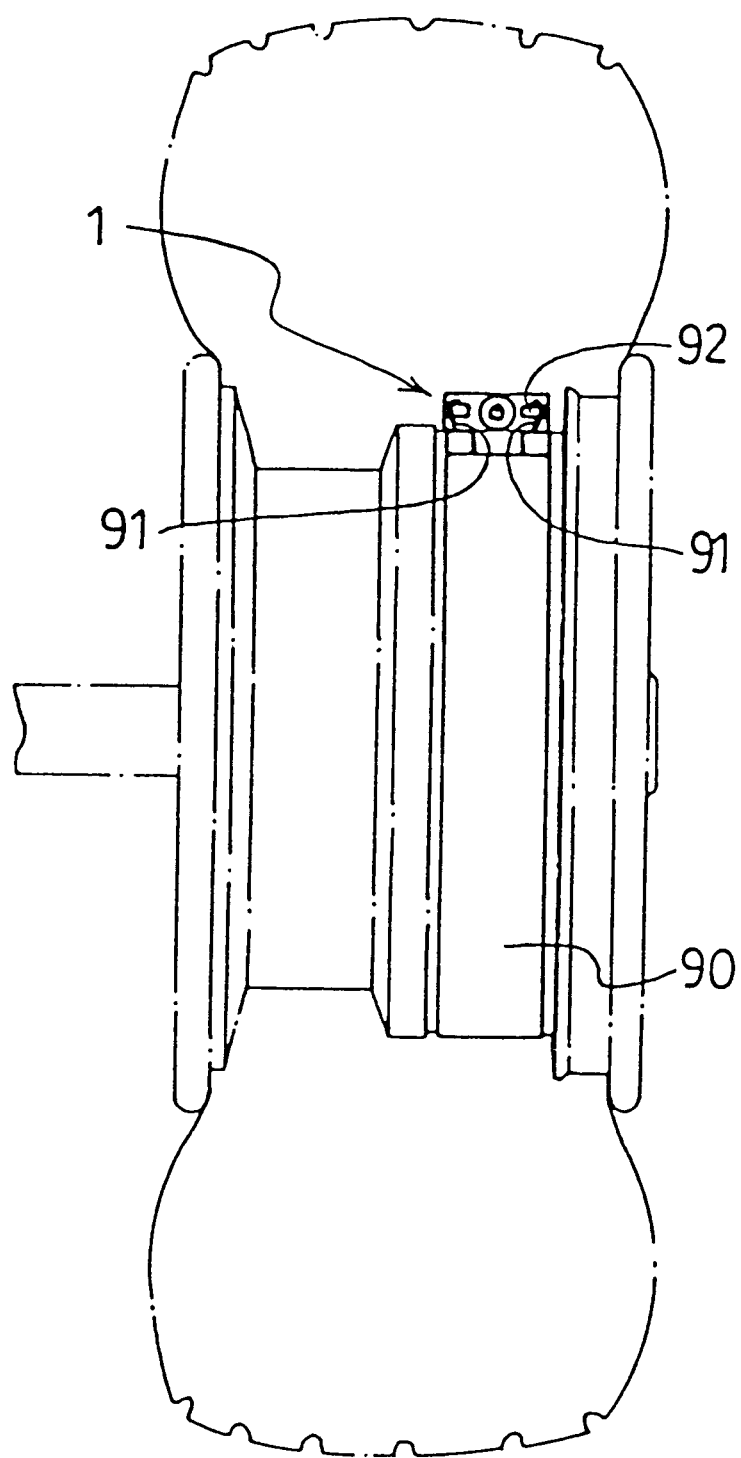
FIG. 15 is a schematic view illustration the pressure gauge when secured to the metal wheel of a pneumatic tire.

Referring to FIGS. 14 and 15, an elastic strap 90 is provided with two hooks 91 at its two opposite ends for engaging respective holes 92 at the casing 10 and the cap 14 so as to secure the pressure gauge 1 to the metal wheel of the respective pneumatic tire, enabling the pressure gauge 1 to detect the pressure of the respective pneumatic tire.

Figure 16:
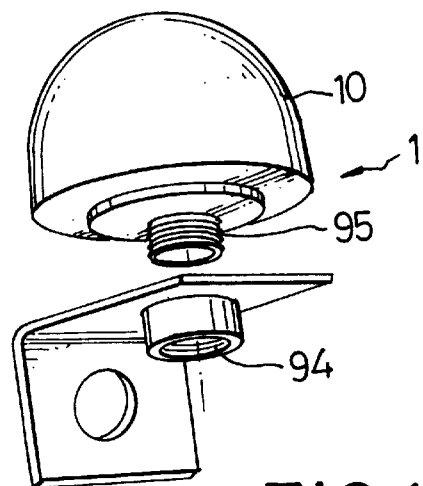
FIG. 16 is a partially exploded view illustrating a casing and a coupling seat of a pressure gauge of the third preferred embodiment of the tire pressure indicator according to the present invention.
Figure 17:
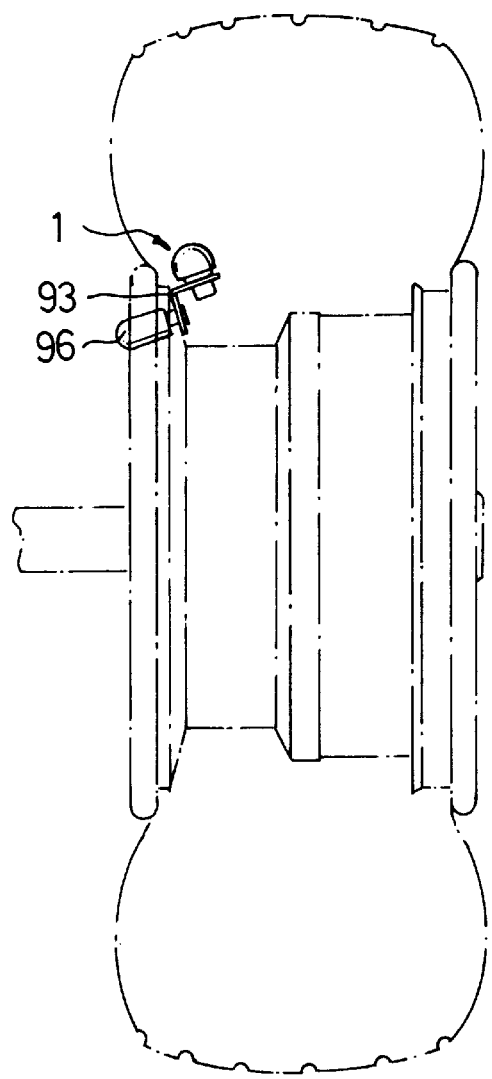
FIG. 17 is a schematic view illustrating how the coupling seat secures the casing to the disk wheel of a pneumatic tire.

Referring to FIGS. 16 and 17, a substantially L-shaped coupling seat 93 is mounted on the rim of the pneumatic tire. The coupling seat 93 is at one side fixed with the air valve 96 of the pneumatic tire, and at an opposite side formed with a coupling portion, such as an inner thread 94. The casing 10 of the pressure gauge 1 has a coupling portion, such as an outer thread 95, for being engaged with the coupling portion 94.

Since the pressure gauges of the tire pressure indicator of this invention are capable of generating power when the pneumatic tires are in motion, the possibility that the pressure gauges will run out of power can be eliminated so as to ensure proper operation of the pressure gauges without causing any inconvenience to the owner of the vehicle. The purpose of the present invention is thus achieved.

While the present invention has been described in connection with what is considered the most practical and preferred embodiments, it is understood that this invention is not limited to the disclosed embodiments, but is intended to cover various arrangements included within the spirit and scope of the broadest interpretation of the present invention so as to encompass all such modifications and equivalent arrangements.

What is claimed is:

1. A tire pressure indicator for the pneumatic tires of a vehicle, said tire pressure indicator comprising a plurality of pressure gauges, at least one receiver circuit adapted to be installed in the vehicle to receive output signal from said pressure gauges wirelessly, and a controller, said pressure gauges each comprising a casing, a power supplying device, a pressure sensing unit, and a transmitter circuit, wherein:

said power supplying device comprising a self-generating voltage unit, said self-generating voltage unit comprising a spring element having a first end secured to said casing and a second end, a weight securely mounted on the second end of said spring element, and a piezoelectric unit securely mounted on said spring element, said spring element being vibrated upon motion of the respective pneumatic tire, thereby causing said piezoelectric unit to generate a voltage output to said pressure sensing unit and said transmitter circuit;

said pressure sensing unit comprising a capacitor means, said capacitor means comprising a motion member, a conductive member, and a converting circuit, said motion member being made of electrically conductive material and spaced from said conductive member at a distance, said distance being changed subject to the air pressure of respective pneumatic tire, thereby causing the capacity of said capacitor means to be changed relatively, said converting circuit comprising an oscillator connected to said capacitor means such that said converting circuit detects the number of RC oscillating waves from said oscillator and converts detected signal into a first signal indication of the pressure of the respective pneumatic tire;

said transmitter circuit receiving said first signal from said pressure sensing unit and outputing a second signal by radio;

said receiver circuit outputing a third signal upon receipt of said second signal;

said controller comprising a control circuit and an indicator circuit, said control circuit receiving said third signal from said pressure gauges and processing said third signal into an indication signal through a processor thereof for output through said indicator circuit.

2. The tire pressure indicator of claim 1, wherein said motion member comprises a top side wall, a bottom mouth, a bellows-like peripheral wall connected between said top side wall and said bottom mouth, and defining an air chamber in communication with said bottom mouth, said bottom mouth receiving air pressure from the respective pneumatic tire for enabling said top side wall to be moved relative to said conductive member, so as to change the capacity of said capacitor means subject to the pressure of the respective pneumatic tire.

3. The tire pressure indicator of claim 1, wherein said motion member is a corrugated metal sheet having a top side wall facing said conductive member, and a bottom side wall, which receives pressure from the respective pneumatic tire for enabling the distance between said top side wall and said conductive member to be changed subject to the air pressure of the respective pneumatic tire, so as to change the capacity of said capacitor means.

4. The tire pressure indicator of claim 1, wherein the number of said at least one receiver circuit is equal to the number of said pressure gauges, and wherein each receiver circuit is respectively installed in the vehicle adjacent to one respective pneumatic tire to receive the second signal from the corresponding pressure gauge.

5. The tire pressure indicator of claim 1, wherein said power supplying device comprises a stand-by power supply unit.

6. The tire pressure indicator of claim 5, wherein said stand-by power supply unit is a rechargeable storage battery.

7. The tire pressure indicator of claim 6, wherein said power supplying device further comprises a charging circuit to boost the voltage of power supply generated by said self-generating voltage unit.

8. The tire pressure indicator of claim 5, wherein said power supplying device further comprises a power saving control circuit to turn off said stand-by power supply unit for a predetermined length of time after said self-generating voltgae unit does no work.

9. The tire pressure indicator of claim 1, wherein said motion member is made of flexible material.

10. The tire pressure indicator of claim 1, wherein said receiver circuit comprises a receiving antenna, a high frequency amplifying circuit, a wave detecting circuit, a low frequency amplifier, and a pulse shaping circuit, said receiving antenna receiving said second signal, enabling the received signal to be processed through said high frequency amplifying circuit, said wave detecting circuit, said low frequency amplifier to said pulse shaping circuit for waveform shaping, so that said pulse shaping circuit outputs a third signal indication of the value of air pressure in the respective pneumatic tire.

* * * * *